F. K. FASSETT.
WORM GEAR.
APPLICATION FILED FEB. 3, 1913.

1,113,172.  Patented Oct. 6, 1914.

Witnesses
C. H. Kruger
M. E. Workman

Inventor
Francis K. Fassett.

UNITED STATES PATENT OFFICE.

FRANCIS K. FASSETT, OF DAYTON, OHIO.

WORM-GEAR.

1,113,172.   Specification of Letters Patent.   Patented Oct. 6, 1914.

Application filed February 3, 1913. Serial No. 745,845.

*To all whom it may concern:*

Be it known that I, FRANCIS K. FASSETT, a citizen of the United States, residing at Dayton, in the county of Montgomery and State of Ohio, have invented a new and useful Improvement in Worm-Gears, of which the following is a specification.

My invention relates to worm-gears and has for its principal object to prevent lost motion, or what is commonly called back-lash, in worm-gears.

Another object is to so construct worm-gears that as the parts wear, the back-lash resulting therefrom may be taken up.

Another object is to alter worm-gears of a certain type in such manner that though they are so badly worn as to be unfit for use in their original form they may, when altered, be restored to their former effectiveness, and operated as long, or longer, after said alteration, and with more satisfactory results than were attained during the greater part of the time they were used before being altered.

There are two kinds of worm-gears: single and double. The former is a single worm enmeshed with a single gear wheel. The latter comprises two worms, one right and one left hand, rigidly secured to a single shaft, and two gears enmeshed with each other, one gear being also enmeshed with each worm. Both kinds of worm-gears are liable, in fact likely, to have more or less back-lash, due to original poor fitting or subsequent wear. This is a serious defect, especially where the gears are used in elevators, for which service worm-gears have come into quite general use. Double worm-gears have one advantage over single ones: They do not require thrust bearings to prevent longitudinal movement of the shaft as single worms do; each worm of the double gear acts as a thrust bearing for the other. Since roller and ball thrust bearings have reached their present state of development this is not, however, as much of an advantage as formerly. My method of preventing back-lash will now be explained.

Figure 1:
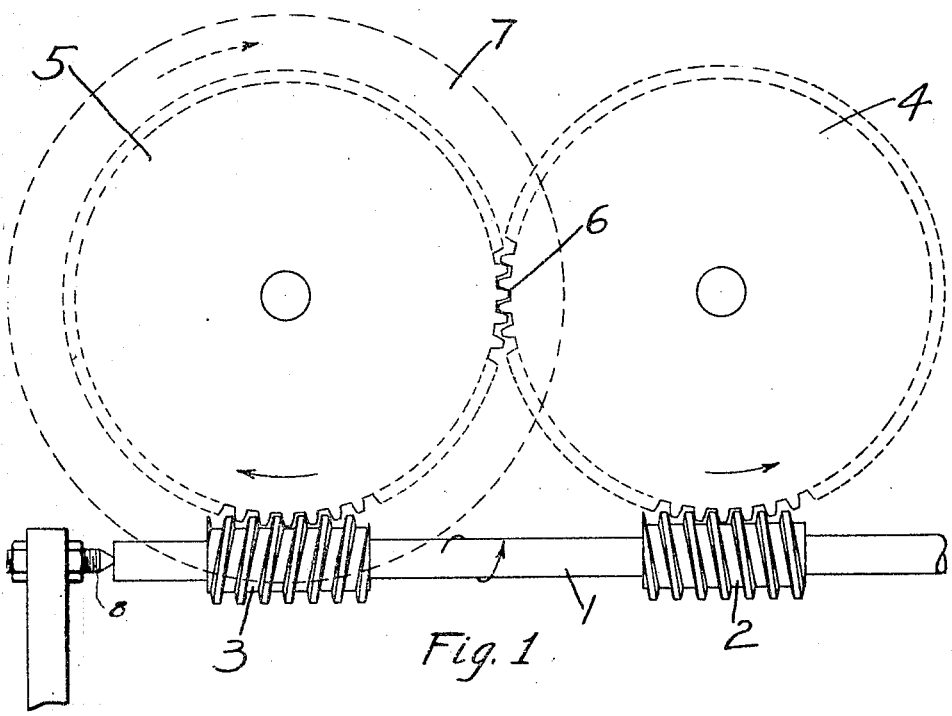
Figure 2:
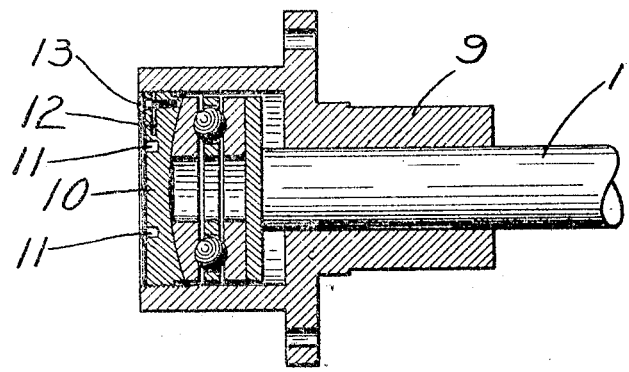

Figure 1 represents a double worm gear, and Fig. 2 a thrust bearing or step. The worms and gears in Fig. 1 are presumed to have been worn considerably.

Operating as a normal double-worm gear, without the step 8 and with the shaft rotating in the direction indicated by the spiral arrow, the worms would tend to separate the lower parts of the gears; i. e., move them in the direction of their arrows. Gear 5 being connected to the drum, which it is presumed would not move until forced to, the worm 3, and hence the shaft 1 and worm 2, would when rotated move longitudinally toward the gear 4. This longitudinal movement of the worm 2, together with its rotary movement, would rotate the gear 4 in the direction of its arrow and bring its teeth into contact with those of the gear 5. The longitudinal movement of the shaft would then cease and rotation of gear 5 begin. Reversing the direction of shaft 1, the gear 5 again remaining stationary until forced to move, the shaft would move to the left, rotating the gear 4 as before but in the other direction, until its teeth engaged those of gear 5 after which the latter would begin to rotate. It is clear therefore that each time the direction of rotation of the shaft 1 occurred it would rotate to some extent and move longitudinally some distance before the gear 5 would start to rotate. The amount of lost motion would, of course, depend upon the condition of the parts, but my invention will eliminate all lost motion as will now be explained.

It will be understood that the shaft and gears are provided with bearings carried by a suitable supporting frame, and the step 8 is mounted in an arm carried by the same frame. By means of the nuts the step may be made to push the shaft longitudinally to the right as far as possible—the limit of its movement being reached when the worms, acting as racks, have rotated both gears in the direction of the arrow on gear 4 until their teeth engage at 6. This may be done with the worm shaft rotating or still, but preferably the latter. Securing the step, I have this condition: The right side of each worm is lying against the teeth of its gear. See Fig. 1. If the shaft be rotated in the direction indicated by the spiral arrow the worm 2 will immediately drive gear 4 in the direction of its arrow and gear 4 will simultaneously drive gear 5. As the right side of worm 3 is lying against the teeth of its gear, it is clear that there will be a space between the left side of the worm and the teeth as shown in the drawing. Therefore, worm 3 will not drive gear 5. Reversing the direction of rotation: since the right side of worm 3 is already in contact with the teeth of gear 5 it will immediately drive gear 5. But worm 2 will not drive gear 4; this for the same reason worm 3 did not drive gear 5.

From the foregoing it is clear that the gear no longer acts in the manner of a double worm gear. Instead, each worm drives its gear independently, but neither worm drives its gear except when it rotates in a certain direction. On this account, since one of the worms is right and the other left hand, the longitudinal thrust on the worm shaft is in the same direction whichever way it rotates, and for this reason the step 8 need be at one end only. Notwithstanding this independence of action there is a certain inter-dependence between the parts, namely: when the shaft is rotating in the direction indicated by the arrow gear 5 depends upon gear 4 for its propulsion, and the worm shaft is prevented from moving longitudinally to the right by the interlocking of gears 4 and 5.

Instead of step 8, a ball thrust bearing may be used. Fig. 2 shows a bearing of this type incased in a housing built out from the shaft bearing 9. The inner wall of the housing, which is cylindrical, is threaded to receive the threaded disk 10. This disk, being provided with spanner wrench holes 11, a slot 12 and clamping screw 13, may be screwed in, pushing the shaft 1 as far as is necessary to take up all back-lash in the gear, after which the screw 13 is drawn up tight to clamp the disk in place.

A worm-gear of this type has decided advantages over any other form of worm-gear. Equipped with a ball or roller thrust bearing it has the efficiency of the best single worm-gear, and since one worm drives the drum in one direction and the other worm drives it in the other direction it has the durability of the double worm-gear. Because of the interlocking action of the gears the parts may be kept entirely free from backlash; this eliminates the noise, and what is far worse, the jarring of the machine. A double worm-gear whose parts have become so badly worn that they cannot be used, may, by putting on the thrust bearing, be converted into this form of gear. When so altered the parts may be used as long as they were used before the conversion, possibly longer, and all that time operate more quietly and satisfactorily than the gear operated during three-fourths of its period of use as a double gear. The mere saving of money which may thereby be effected is quite an item, as the cost of converting a gear will probably not exceed one-third of the cost of renewing the parts.

What I claim is as follows:

1. The combination of a worm-gear comprising two toothed wheels rotatably mounted with their teeth enmeshed and a pair of worms mounted upon a common shaft with one worm engaging each wheel, and a thrust bearing adapted to prevent longitudinal movement of the shaft in one direction.

2. The combination of a worm-gear comprising two toothed wheels rotatably mounted with their teeth enmeshed and a pair of worms mounted upon a common shaft with one worm engaging each wheel, and a thrust bearing adapted to push the shaft longitudinally as far as the worms and teeth will permit.

3. The combination of a worm-gear comprising two toothed wheels rotatably mounted with their teeth enmeshed and a pair of worms, one right hand and the other left hand, mounted upon a common shaft with one worm engaging each wheel, and a thrust bearing to hold the shaft in such position longitudinally that when it rotates in one direction only one wheel is driven by its worm and when rotated in the opposite direction only the other wheel is driven by its worm.

4. A worm-gear comprising a shaft with a right-hand and a left-hand worm rigidly secured thereto, a pair of gear wheels having their teeth enmeshed with each other, one of the gears being also enmeshed with each worm, and a thrust bearing whereby the shaft may be moved longitudinally and held in a position where the interlocking of the gears prevents further longitudinal movement thereof.

5. A worm-gear comprising a shaft with a right-hand and a left-hand worm rigidly secured thereto, a pair of gear wheels having their teeth enmeshed with each other, one of the gears being also enmeshed with each worm, and a thrust bearing whereby the shaft may be moved longitudinally and held in a position where the worms are prevented from acting simultaneously to drive their respective gears.

6. The combination of a worm-gear having a worm carrying shaft adapted to rotate in either direction, and means whereby the longitudinal thrust of the shaft is in the same direction whichever way it rotates.

7. The combination of a worm-gear comprising two toothed wheels rotatably mounted with their teeth enmeshed and a pair of worms mounted upon a common shaft with one worm engaging each wheel, and means adapted to coöperate with the worms and teeth to prevent longitudinal movement of the shaft.

8. The combination of a worm-gear, comprising two toothed wheels rotatably mounted with their teeth enmeshed and a pair of worms mounted upon a common shaft with one worm engaging each wheel, and a thrust bearing adapted to positively push the shaft longitudinally as far as the worm and teeth will permit.

9. A worm-gear comprising a shaft with a right-hand and a left-hand worm rigidly secured thereto, a pair of gear wheels having their teeth enmeshed with each other, one of the gears being also enmeshed with each worm, and a thrust bearing whereby the shaft may be positively moved longitudinally and held in a position where the interlocking of the gears prevents further longitudinal movement thereof.

10. A worm-gear comprising a shaft with a right-hand and a left-hand worm rigidly secured thereto, a pair of gear wheels having their teeth enmeshed with each other, one of the gears being also enmeshed with each worm, and a thrust bearing whereby the shaft may be positively moved longitudinally and held in a position where the worms are prevented from acting contemporaneously to drive their respective gears.

11. The combination of a worm-gear having a worm carrying shaft adapted to rotate in either direction, means whereby the longitudinal thrust of the shaft is in the same direction whichever way it rotates, and means for positively preventing longitudinal movement of the shaft in the direction of its thrust.

FRANCIS K. FASSETT.

Witnesses:
C. H. KRUGER,
J. A. WORTMAN.